United States Patent
Wichitamornloet

(10) Patent No.: US 11,370,901 B2
(45) Date of Patent: Jun. 28, 2022

(54) NON-EXTRACTABLE AND FIBER-FREE FOOD OIL REMOVING FILM AND PRODUCTION METHOD THEREOF

(71) Applicant: ENZPIRE INDUSTRY COMPANY LIMITED, Bangkok (TH)

(72) Inventor: Arthorn Wichitamornloet, Bangkok (TH)

(73) Assignee: ENZPIRE INDUSTRY COMPANY LIMITED, Bangkok (TH)

( * ) Notice: Subject to any disclaimer, the term of this patent is extended or adjusted under 35 U.S.C. 154(b) by 436 days.

(21) Appl. No.: 16/610,732

(22) PCT Filed: Apr. 10, 2018

(86) PCT No.: PCT/TH2018/000017
§ 371 (c)(1),
(2) Date: Nov. 4, 2019

(87) PCT Pub. No.: WO2019/199239
PCT Pub. Date: Oct. 17, 2019

(65) Prior Publication Data
US 2020/0165423 A1  May 28, 2020

(51) Int. Cl.
| | | |
|---|---|---|
| C08L 23/12 | (2006.01) | |
| A23L 5/20 | (2016.01) | |
| B29C 48/08 | (2019.01) | |
| B29C 48/00 | (2019.01) | |
| C08K 5/00 | (2006.01) | |
| B32B 27/20 | (2006.01) | |
| B29K 23/00 | (2006.01) | |
| B29K 105/04 | (2006.01) | |
| C08K 5/01 | (2006.01) | |
| C08K 5/053 | (2006.01) | |
| C08K 5/20 | (2006.01) | |
| B32B 3/26 | (2006.01) | |
| B32B 7/12 | (2006.01) | |
| B32B 27/32 | (2006.01) | |

(52) U.S. Cl.
CPC .............. *C08L 23/12* (2013.01); *A23L 5/273* (2016.08); *B29C 48/0018* (2019.02); *B29C 48/08* (2019.02); *B32B 3/266* (2013.01); *B32B 7/12* (2013.01); *B32B 27/205* (2013.01); *B32B 27/32* (2013.01); *C08K 5/0083* (2013.01); *B29K 2023/12* (2013.01); *B29K 2105/041* (2013.01); *B29K 2105/045* (2013.01); *B32B 2307/518* (2013.01); *B32B 2439/70* (2013.01); *C08K 5/01* (2013.01); *C08K 5/053* (2013.01); *C08K 5/20* (2013.01); *C08L 2203/16* (2013.01); *C08L 2205/24* (2013.01); *C08L 2207/10* (2013.01)

(58) Field of Classification Search
CPC ... B29C 48/0018; B29C 48/08; C08K 5/0083; C08K 5/01; C08K 5/053; C08K 5/20; B29K 2023/12; B29K 2105/041; B29K 2105/045; C08L 23/12; C08L 2203/16; B32B 27/205; B32B 7/12; B32B 27/32; B32B 2307/41
See application file for complete search history.

(56) References Cited

U.S. PATENT DOCUMENTS

| | | | |
|---|---|---|---|
| 2003/0207138 A1* | 11/2003 | Kong | C08L 23/12 428/500 |
| 2006/0177632 A1* | 8/2006 | Jacoby | B32B 27/08 428/131 |
| 2006/0189744 A1* | 8/2006 | Tse | C08L 23/20 524/451 |
| 2016/0347041 A1 | 12/2016 | Park et al. | |
| 2019/0218352 A1* | 7/2019 | Brunner | B32B 27/205 |

FOREIGN PATENT DOCUMENTS

| | | |
|---|---|---|
| CA | 2017246 C | 1/1994 |
| CA | 2001234 C | 12/1998 |
| JP | 2005144830 A | 6/2005 |
| JP | 2016037586 A | 3/2016 |
| JP | 2017109371 A | 6/2017 |
| WO | 2004072161 A1 | 8/2004 |
| WO | 2007015415 A1 | 2/2007 |
| WO | 2007046225 A1 | 4/2007 |

OTHER PUBLICATIONS

International Search Report dated Oct. 23, 2018 from corresponding PCT Application No. PCT/TH2018/000017.

* cited by examiner

*Primary Examiner* — Hai Vo
(74) *Attorney, Agent, or Firm* — Innovation Capital Law Group, LLP; Vic Lin

(57) ABSTRACT

Non-extractable and fiber-free food oil removing film is a flexible with numerous open-cell of microporous structure used for removing oils from cooked food. The said plastic film is made from a mixture of polypropylene polymer, specific carbon atom olefin fillers and nucleating agent. The mixture is plasticized and formed into a tubular film substrate by a tubular blown film extruder, then following biaxial stretching by a specific isostatic pressurized hot water technique forming numerous of smooth, uniform, lipophilic, microporous structure that absorb and retain any kinds of oils from cooked foods. The film is applied in various forms varying to its applications such as sheet, perforated rolls, or laminated on other functional substrates to from a novel food packaging by lamination methods.

13 Claims, No Drawings

NON-EXTRACTABLE AND FIBER-FREE FOOD OIL REMOVING FILM AND PRODUCTION METHOD THEREOF

FIELD OF THE INVENTION

The present invention relates to a plastic film, packaging, for removing excessive oil from cooked foods safely.

BACKGROUND OF THE INVENTION

Oily foods may give delicious taste, but excess oil consumption causes some health risks such as obesity, high blood pressure and heart disease. Therefore, many techniques are applied to reduce the excessive food oil from cooked foods.

There are some general practices to remove excessive oil from cooked foods, mainly by means of basic physical separations, such as draining fried oils on a strainer, skimming or draining off floated oily layer on the top of meat soup. Though, the cooked foods after proceeded with above mentioned methods sometimes remain oily. So, another step to get rid of the rest oil, by using absorbents, especially oil absorbing sheet is applied.

The oil absorbing sheet used in recent market can be dividing as their structural types:

a. Cellulosic papers

Currently, some kinds of cellulosic webs, such as paper towel, paper tissue, are used for removing excessive oil from oily foods, that the physical capillary force play a main role to attract and retain the oil into its voids, while chemically hydroxyl groups along cellulose chains dominantly absorb water. So, both oil and water are absorbed into the webs, which absorbed water will decrease mechanical strength of the webs leading to tear apart and losing their short fiber entanglement contaminating into the cooked food.

b. Polyolefin non-woven webs

In contrast to the cellulosic paper, polyolefin non-woven webs are made from synthetic fibers, especially long filament of polypropylene. These plastic fiber webs do not absorb water but selectively absorb only oil. But, with their fine and loose bonding web structure that trends to be damaged easily and lose their fibers contaminating into cooked foods likes the cellulosic paper mentioned above.

However, from worldwide patent search, there are a few film productions containing components close to those of the invention of non-extractable and fiber-free food oil removing film as the followings:

Patent publication No. WO2007046225, "Microporous polypropylene films and process for producing the same", explaining microporous polypropylene film consisting of polypropylene, nucleating agent for β-form crystals, ethylene/a-olefin copolymer;

Japanese Patent publication No. JP2016037586, "Film or sheet obtained from polypropylene composition", disclosing polypropylene film containing propylene copolymer, α-olefine, nucleating agent produced with a biaxial stretching process;

Patent publication No. CA2001234, "Polypropylene stretched film", defining polypropylene film comprising polypropylene, and olefin acting as nucleating agent, having at least 6 carbon atoms;

Canadian Patent publication No. WO200715415, "Polypropylene resin composition, film or sheet, stretched film obtained from such film or sheet, multilayer body, and stretched film obtained from such multilayer body", describing polypropylene resin comprising propylene polymer and olefin copolymer;

Japanese Patent publication No. JP2017109371, " Biaxially oriented release film", explaining polypropylene film comprising polypropylene and (Alpha-olefin)α-olefin produced with biaxially oriented process; and Canadian Patent publication CA2017246, "Stretched films of polypropylene", discussing polypropylene film comprising polypropylene and nucleating agent.

From the cited patents mentioned above, almost all cited patents contain the film playing a role in preserving food and absorbing excessive oil or fat in food. There are a few problems with contamination of the fiber from its contact with food after its use in some period.

Even, the oil absorbing sheet can reduce excessive oil from oily foods; both cellulosic paper and plastic fiber web still do not widely used in the market as some of their drawbacks about hygienic and safety, especially in fiber contamination concerns. The non-extractable and fiber-free food oil removing film according to this invention not only performs as an excellent oil absorbent, but also solves the fiber contamination problems. Besides, the specific non-extractable additives and fillers are selected to ensure their hygienic and safety usage as direct food contact oil removing film by the specific range of the carbon atom of its composition.

SUMMARY OF THE INVENTION

Accordingly, the present invention is a flexible plastic film with numerous open-cell of microporous structure used for removing oils from cooked food, made from a mixture of polypropylene polymer, specific olefin fillers and nucleating agent. The mixture is plasticized and formed into a tubular film substrate by a tubular blown film extruder, then following biaxial stretching by a specific isostatic pressurized hot water technique forming numerous of smooth, uniform, lipophilic, microporous structure that will absorb and retain any kinds of oils from cooked foods.

The film different from those of prior art in the matter of components, a ratio of the components, and the characteristics of each film component which is distinctively different namely, isotactic polypropylene polymers with a melt flow rate in the range of 0.1-5.0 grams per 10 minutes and selected olefin fillers with carbon atoms in the range of 29 to 200, which solve the problems of olefin fillers migration or leaching out.

In conclusion, the film of this invention assist preventing food from contaminating from some parts of film, fibers contamination, occurring in the prior arts. Additionally, the film according to this invention keeps food less oil while do not absorb water. So, it provides a healthier, hygienic food and safety choice for removing excessive oil from cooked food.

DETAILED DESCRIPTION OF THE INVENTION

Non-extractable and fiber-free food oil removing film is a flexible with numerous open-cell of microporous structure used for removing oils from cooked food that are made from a mixture comprising:

a. Isotactic polypropylene polymers in concentration of 65-75% by weight with a melt flow rate in the range of 0.1-5.0 grams per 10 minutes b. Olefin fillers with carbon atom number in the range of C29 to C200 in concentration of 25-35% by weight
c. Nucleating agents in concentration of 100 to 2,500 part per millions (ppm), the said nucleating agent can be selected from sorbitol derivatives or benzenetriamide derivatives or combination thereof.

The non-extractable and fiber-free food oil removing film can be applied in the selected from sheet or perforated roll or laminated multilayer film or combination thereof.

A production method of the non-extractable and fiber-free oil removing film comprises the following steps:
a. Plasticizing the mixture and forming into a tubular blown film substrate with a transparent, finely dispersed heterophasic structure by a tubular blown film extruder; and
b. Simultaneously biaxial stretching the substrate to generate the processed film by a specific isostatic pressurized hot water stretching unit which is contained pressurized hot water with temperature in the range of 50 to 100 degree Celsius in tubular blown film bubble.

Volume of the pressurized hot water stretch or draw the said film in transverse direction and expand the plastic film bubble diameter which determine the film thickness, lay flat width and transverse direction drawing percentage. While, a serial of nip rollers which each set of the nip rolls rotate forward faster and faster that determines the film thickness and machine direction drawing percentage. The processed film may be a single layer or multilayer tubular blown film substrate varying to its final applications.

After the process of biaxial stretching, the film appearance becomes an opaque, smooth film with numerous open-cell of microporous structure dispersing thoroughly all film structure. To achieve high oil absorption performance, the biaxial stretching or drawing percentage in both directions, machine direction and transverse direction, is in the range of 150% to 500%. The processed film is provided pore volume after biaxial stretching in the range of 30% to 60% of the total film volume. The variation of drawing percentage in both directions affects the final product characteristics and performances.

A ratio of the drawing percentage of transverse direction per the drawing percentage of machine direction is in the range of 0.7 to 1.2 for all film applications and forms such as sheet, perforated roll or laminated multilayer film The said ratio is preferably in the range of 1.0 to 1.2 when the film is applied in perforated roll form application to ensure inducing easy and smooth tear along the transverse direction perforated line.

For another application, form-fill-seal (FFS) food packaging, the film can be laminated or bonded on other functional substrates by lamination methods which bonding area is in the range of 1% to 40%. The lamination methods can be selected from melt-lamination or adhesive lamination or combination thereof. The said lamination method is provided in arranged discrete pattern to form a novel food packaging with oil absorbing liner. Excessive oil from fried snacks will be absorbed and retained inside, that keep the fried food or snack crispier and heathier.

The invention claimed is:

1. A non-extractable and fiber-free food oil removing film which is a flexible film with numerous open-cells of a microporous structure used for removing oils from cooked food, and obtained from a mixture comprising:
   a. an isotactic polypropylene polymer in a concentration of 65-75% by weight;
   b. an olefin filler with a carbon atom number in the range of C29 to C200 in a concentration of 25-35% by weight; and
   c. a nucleating agent in a concentration of 100 to 2,500 parts per million (ppm),
   wherein said nucleating agent is selected from the group consisting of sorbitol derivatives, benzenetriamide derivatives and a combination thereof.

2. The non-extractable and fiber-free food oil removing film according to claim 1 wherein said isotactic polypropylene polymer has a melt flow rate in the range of 0.1 to 5.0 grams per 10 minutes.

3. The non-extractable and fiber-free food oil removing film according to claim 1 wherein said film is in the form of a sheet, a perforated roll, a laminated multilayer film, or any combinations thereof.

4. A method for producing the non-extractable and fiber-free food oil removing film of claim 1, comprising:
   a. plasticizing the mixture and forming into a tubular blown film substrate with a transparent, finely dispersed heterophasic structure by a tubular blown film extruder; and
   b. simultaneously biaxial stretching the substrate to generate a processed film by a specific isostatic pressurized hot water stretching unit which is contained hot water in the said unit.

5. The method for producing the non-extractable and fiber-free food oil removing film according to claim 4 wherein the hot water has the temperature in the range of 50 to 100 degrees Celsius.

6. The method for producing the non-extractable and fiber-free food oil removing film according to claim 4 wherein the biaxial stretching has drawing percentage of machine direction in the range of 150% to 500%.

7. The method for producing the non-extractable and fiber-free food oil removing film according to claim 4 wherein the biaxial stretching has drawing percentage of transverse direction in the range of 150% to 500%.

8. The method for producing the non-extractable and fiber-free food oil removing film according to claim 4 wherein the biaxial stretching has a ratio of the drawing percentage of transverse direction to the drawing percentage of machine direction in the range of 0.7 to 1.2 for all film applications and forms.

9. The method for producing the non-extractable and fiber-free food oil removing film according to claim 4 wherein the biaxial stretching has the ratio of the drawing percentage of transverse direction to the drawing percentage of machine direction in the range of 1.0 to 1.2 when the film is in the form of a perforated roll.

10. The method for producing the non-extractable and fiber-free food oil removing film according to claim 4 wherein the processed film has a pore volume after the biaxial stretching in the range of 30% to 60% of the total film volume.

11. The method for producing the non-extractable and fiber-free food oil removing film according to claim 4 further comprising:
    laminating the processed film to a functional substrates wherein a bonding area between the processed film and the functional substrate is covered in the range of 1% to 40% of the interface.

12. The method for producing the non-extractable and fiber-free food oil removing film according to claim 11 wherein laminating the processed film to the functional substrate by a process selected from the group consisting of melt-laminating, adhesive laminating, and a combination thereof.

13. The method for producing the non-extractable and fiber-free food oil removing film according to claim 11 wherein the laminating process is provided in an arranged discrete pattern.

\* \* \* \* \*